United States Patent
Garrett

(10) Patent No.: US 10,511,809 B2
(45) Date of Patent: *Dec. 17, 2019

(54) MOBILE SURVEILLANCE SYSTEM

(71) Applicant: Antonio Garrett, Jacksonville, FL (US)

(72) Inventor: Antonio Garrett, Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/829,954

(22) Filed: Dec. 3, 2017

(65) Prior Publication Data

US 2018/0152672 A1    May 31, 2018

Related U.S. Application Data

(63) Continuation of application No. 12/462,187, filed on Jul. 31, 2009, now Pat. No. 9,854,207.

(51) Int. Cl.
*H04N 7/18* (2006.01)

(52) U.S. Cl.
CPC ..................... *H04N 7/18* (2013.01)

(58) Field of Classification Search
CPC ...... H04N 7/18; H04N 7/147; H04N 7/17327; H04L 65/4092; H04L 67/02; H04L 67/148
USPC ........................................................ 348/143
See application file for complete search history.

(56) References Cited

U.S. PATENT DOCUMENTS

| | | | |
|---|---|---|---|
| 6,943,682 B1 | 9/2005 | Dowens et al. | |
| 8,810,656 B2 | 8/2014 | Keller | |
| 2002/0080882 A1 | 6/2002 | Kitagawa | |
| 2005/0064883 A1 | 3/2005 | Heck et al. | |
| 2005/0138620 A1 | 6/2005 | Lewites | |
| 2005/0280704 A1* | 12/2005 | Clare | G08B 13/1672 348/143 |
| 2006/0001537 A1* | 1/2006 | Blake | G08B 13/19656 340/521 |
| 2006/0155851 A1 | 7/2006 | Ma | |
| 2007/0016636 A1 | 1/2007 | Boerries et al. | |
| 2007/0130600 A1* | 6/2007 | Yanai | G08B 13/19676 725/105 |
| 2007/0149184 A1* | 6/2007 | Viegers | G06Q 10/06 455/422.1 |
| 2007/0185989 A1 | 8/2007 | Corbett et al. | |

(Continued)

FOREIGN PATENT DOCUMENTS

WO    2006/109162 A2    10/2006

*Primary Examiner* — Tu T Nguyen
(74) *Attorney, Agent, or Firm* — Clayton, McKay & Bailey, PC

(57) ABSTRACT

A system and method comprising a mobile device in communication with a server, wherein the server is adapted for receiving surveillance data transferred electronically from a surveillance area. At least one camera is positioned at the surveillance area for capturing surveillance data, wherein the surveillance data comprises metadata comprising at least one of audio, video, images, point in time and location of the surveillance area. The surveillance data is transferred from the server to said mobile device and displayed on the mobile device upon a user request. The surveillance data may be transferred automatically using a combination of a radio, a network, or a base station. A motion detection means can be engaged to the system to detect variations in motion measurements and provide global positioning data at the surveillance area. The system provides automatic updates to a user regarding delivery surveillance data corresponding to the user request.

20 Claims, 5 Drawing Sheets

(56) References Cited

U.S. PATENT DOCUMENTS

| | | | |
|---|---|---|---|
| 2007/0273501 A1 | 11/2007 | Benco et al. | |
| 2008/0013705 A1 | 1/2008 | Yoffie et al. | |
| 2008/0032703 A1 | 2/2008 | Krumm et al. | |
| 2008/0136914 A1 | 6/2008 | Carlson et al. | |
| 2008/0174678 A1 | 7/2008 | Solomon | |
| 2009/0322874 A1* | 12/2009 | Knutson | G08B 13/196 348/143 |
| 2010/0113068 A1 | 5/2010 | Rothschild | |
| 2010/0246669 A1 | 9/2010 | Harel | |
| 2012/0314063 A1* | 12/2012 | Cirker | G08B 13/19652 348/143 |

* cited by examiner

MOBILE SURVEILLANCE SYSTEM

FIELD OF THE INVENTION

The present invention generally relates to security systems. More specifically, the present invention is drawn to a mobile surveillance system constructed to provide real time surveillance of a surveillance area to a user's mobile device, such as a mobile communication device.

DESCRIPTION OF THE RELATED ART

This invention relates to a surveillance system and more particularly to a mobile surveillance system wherein at least one or more digital camera units positioned at a surveillance area are adapted to communicate with each other to provide surveillance of said area. The invention has particular utility in mobile or localized security against intruders and to provide surveillance of designated locations such as a car, a home, a daycare or any identified surveillance area. Security has become widely necessary in modern times as a means of crime prevention and this invention can be utilized as a crime deterrent in a variety of areas because it provides a real time means of surveillance and security. It will be readily evident that the present invention is not limited to this particular application and can be used in many industrial applications. The task of providing security is extremely onerous and sometimes involves providing endless ours of safekeeping by a person being on watch at a surveillance location. Often times this process results in large amounts of finances spent on surveillance that usually does not provide for adequate safety at the desired location. As an alternative or in conjunction with a security person, there are a number of electronic surveillance systems which are known and available in the prior art.

Generally such electronic systems include static devices that may include one or more sensors which detect conditions at the surveillance location such as intrusion or fire (smoke or heat) and upon detection of an identified condition at the location, the local device at the location will trigger an alarm. The alarm is desired to alert the proper law enforcement authority and/or cause the nervous intruder to panic and thus leave the premises prematurely and without taking any valuables. These systems may provide notice to the law enforcement agencies and provide an additional obstacle to the intruder; however, they usually require long periods of time to notify authorities and do not provide efficient data regarding the nature of the intrusion. Additionally, these types of systems usually can be easily circumvented by a savvy intruder.

More sophisticated electronic surveillance systems are available in the prior art that are able to communicate with base stations at remote locations and report alarm conditions such as intrusion or fire. Although these types of systems are very useful in providing the ability to notify security vehicles through the use of radio. Upon receiving notification, the radio controlled security vehicles mobilized to attend the premises where an alarm condition is detected are often inordinately delayed in reaching the designated premises and this is a major disadvantage of these types of systems.

Furthermore, the large number of false alarms which occur with sensitive electronic monitoring devices such as infra-red detectors and the like causes a major inefficiency of these 'base station' systems.

Accordingly, it is an object of this invention to provide an improved mobile surveillance system which overcomes one or more of the aforementioned problems of existing surveillance systems.

Thus, the invention provides a mobile surveillance system comprising at least one camera adapted to a surveillance area and in communication with a mobile device to provide real time surveillance to a user.

SUMMARY OF THE INVENTION

The foregoing problems are solved and a technical advance is achieved by an illustrative mobile surveillance system comprising a mobile device in communication with a server, wherein the server is adapted for receiving surveillance data transferred electronically from a surveillance area. The mobile surveillance system includes at least one camera positioned at the surveillance area for capturing surveillance data, wherein the surveillance data comprises metadata comprising at least one of audio, video, images, point in time and location of the surveillance area. The surveillance data is transferred from the server to the mobile device and displayed on the mobile device upon a user request.

In one aspect of the present invention, the mobile surveillance system can provide a motion detection means to detect variations in motion measurements at the surveillance area. The motion detection means may include a global positioning system receiver to provide navigational data comprising a latitude coordinate and a longitude coordinate of the surveillance area. Alternatively, the mobile surveillance system may further comprise a radio in communication with the camera and mobile device, wherein the radio includes frequency tuners to enable a user to receive surveillance data transmitted over a predetermined frequency.

In another aspect of the present invention, the mobile surveillance system may automatically update a user by sending the user a short message service message indicating the delivery of the surveillance data corresponding to the user request. The server of the mobile surveillance system may be in communication with a network and a base station, wherein the server is adapted to receive surveillance data from the base station through the communication with the network. The base' station sends a command to the server to transmit surveillance data to the mobile device and the server automatically updates surveillance data to the mobile device by sending surveillance data obtained from the base station to the mobile device. Alternatively, the system can include a software application in communication with the mobile device to synchronize the delivery of surveillance data and corresponding metadata to a display of the mobile device with the associated user request.

Other systems of the present invention provide a server comprising a memory and a processor, wherein the memory is configured to store surveillance data and the processor is configured to transfer surveillance data to the mobile device. Additionally, the mobile device may also include a memory and a processor, wherein the memory is configured to store surveillance data and the processor is configured to deliver surveillance data to a display of the mobile device.

In yet another aspect of the present invention, a mobile surveillance system includes a mobile device in communication with a server, wherein the server is adapted for receiving surveillance data transferred electronically from a surveillance area. The surveillance data may include metadata comprising at least one of audio, video, images, point in time and location of the surveillance area. The system also provides at least one camera positioned at the surveillance area for capturing surveillance data and a motion detection mechanism operably engaged to the camera, wherein the server comprises a processor that signals the server to transfer surveillance data to the mobile device when the motion detection mechanism obtains a motion detection measurement that exceeds a predetermined threshold indicating to a user that the surveillance area is unsecure. The surveillance data is delivered to a display of the mobile device when the motion detection mechanism obtains a motion detection measurement that exceeds the predetermined threshold of the user.

Alternatively, the processor signals the server to retain the stored surveillance data when the motion detection mechanism obtains a motion detection measurement that reaches a predetermined threshold indicating to the user that the surveillance area is not secure. In this type of mobile surveillance system the motion detection means can also provide a global positioning system receiver to provide navigational data comprising a latitude coordinate and a longitude coordinate of the surveillance area. In addition, the system may automatically update a user by sending the user a short message service message indicating the delivery of the surveillance data corresponding to the user request. In an alternate embodiment of this system, the server may be in communication with a network and a base station, wherein the server is adapted to receive surveillance data from the base station through the communication with the network.

In another aspect of the present invention, a method of delivering surveillance data to a mobile device includes the steps of providing a mobile device in communication with a server, wherein the server is adapted for receiving surveillance data transferred electronically from a surveillance area. The method also includes the steps of providing at least one camera positioned at the surveillance area for capturing surveillance data. Subsequently, the method includes the steps of transferring surveillance data to the server comprising a memory configured to store surveillance data and a processor configured to transfer surveillance data to the mobile device. The method further includes the steps of transferring surveillance data from the server to the mobile device comprising a memory configured to store surveillance data and a processor configured to associate the surveillance data to a user request. In addition, the method includes the step of displaying the surveillance data on the mobile device upon a user request. It has also been contemplated that more than one camera may be used at anytime. For example, two or more cameras may be engaged to the surveillance area. Furthermore, it is contemplated that the user may request varying types of data to be displayed to the mobile device based on predetermined user requests.

These and other advantages, as well as the invention itself, will become apparent in the details of construction and operation as more fully described below. Moreover, it should be appreciated that several aspects of the invention can be used with other types of mobile surveillance systems used for providing security surveillance.

BRIEF DESCRIPTION OF THE DRAWINGS

These and other features, aspects, and advantages of the present invention are better understood when the following Detailed Description is read with reference to the accompanying drawings.

DETAILED DESCRIPTION

Figure 1:
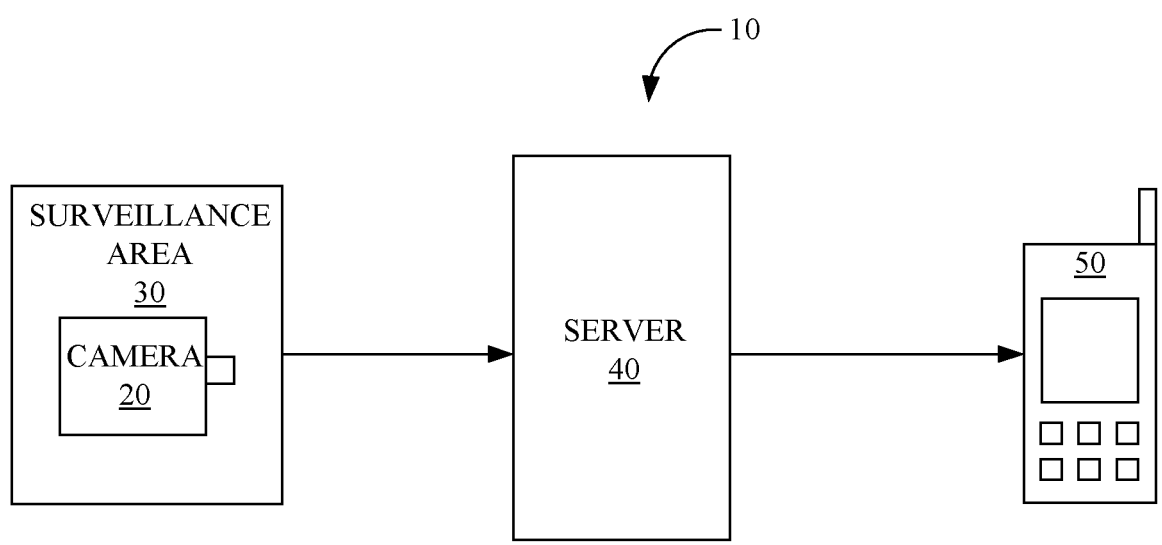
FIG. 1 depicts a block diagram of one embodiment of a mobile surveillance system, wherein the system comprises a mobile device in communication with a server.

The invention is described with reference to the drawings in which like elements are referred to by like numerals. The relationship and functioning of the various elements of this invention are better understood by the following detailed description. However, the embodiments of this invention are not limited to the embodiments illustrated in the drawings. It should be understood that the drawings are not to scale and in certain instances details have been omitted, which are not necessary for an understanding of the present invention, such as conventional fabrication and assembly.

Referring now to FIG. 1, a mobile surveillance system 10 is shown, according to one embodiment of the present invention. In this embodiment of the present invention, a camera 20 is connected to a surveillance area 30, such as a motor vehicle, wherein a user can transmit a surveillance request using a mobile device 50, thereby initiating a real time surveillance update. The mobile surveillance-system also comprises a server 40 that is in communication with the mobile device. When the user sends a surveillance request, the mobile device 50 is updated with real time surveillance data recorded from the camera 20 located at the surveillance area 30. The surveillance data may be comprised of at least one of video, audio and image data of the surveillance area 30. In an alternative embodiment of the present invention, the mobile device 50 may be automatically updated with at least one type of surveillance data captured from the surveillance area 30 being monitored and recorded.

FIG. 1 depicts the camera 20 connected to the surveillance area 30, wherein the camera 20 captures surveillance data from the surveillance area 30. This surveillance data can be stored or transferred via the server 40 for future use of the system 10. The camera 20 includes a control apparatus which directs the recording of the surveillance data supplied by the camera 20. The starting and stopping of the recording and transfer of the recording surveillance data from the surveillance area 30 can be controlled via the mobile device 50. Thus, the user can control the activation of the mobile surveillance system 10 from any location. The camera 20 can be attached to any portion of the surveillance area 30.

For example, in a motor vehicle, the camera 20 can be attached to the interior or exterior of the vehicle thereby allowing any intruders to be recorded and any captured audio and video data of any activity to be stored. The user can program the camera 20 to start and stop recording at designated times of day utilizing his mobile device 50. For instance, during periods of vacation where a surveillance area is left unsecured, the user may send a request to capture and record surveillance data using the camera 20 only during the night hours, such as 8 pm to 8 am. In addition, the mobile device 50 of the user can be connected with the camera 20 to synchronize the displaying of audio, video and image data recorded with the camera 20. This allows the user to obtain real time surveillance data of the surveillance area 30 at any given time. Alternatively, the user may request that surveillance data be updated intermittently at set time intervals. For example, the user may request at least one type of surveillance data to be uploaded and displayed to the mobile device 5 every hour.

In another embodiment of the present invention, the surveillance data may be stored on the mobile device 50 and transferred directly to the mobile device 50 from the surveillance area 30. However, as a result of the limited storage capacity of the mobile device 50, the amount of surveillance data that can be stored is limited. As such, surveillance data may be accessed and updated by the mobile device 50 at the occurrence of an event, such as a predetermined time, motion detection, or similarly associated event. For example, surveillance data of an intruder at a vehicle can be captured as video data and displayed on the mobile device, while simultaneously listening to audio data of the intruder at the surveillance area at a specific time. In another example, wherein the mobile surveillance system 10 is utilized in a daycare facility, surveillance data of a baby at a daycare can be captured as video data and displayed on the mobile device 50 of a parent user, while the user is simultaneously listening to audio data of the baby captured during activities according to a specific time 25 or event, such as feeding, playing, or a similar event required motion.

Figure 2:
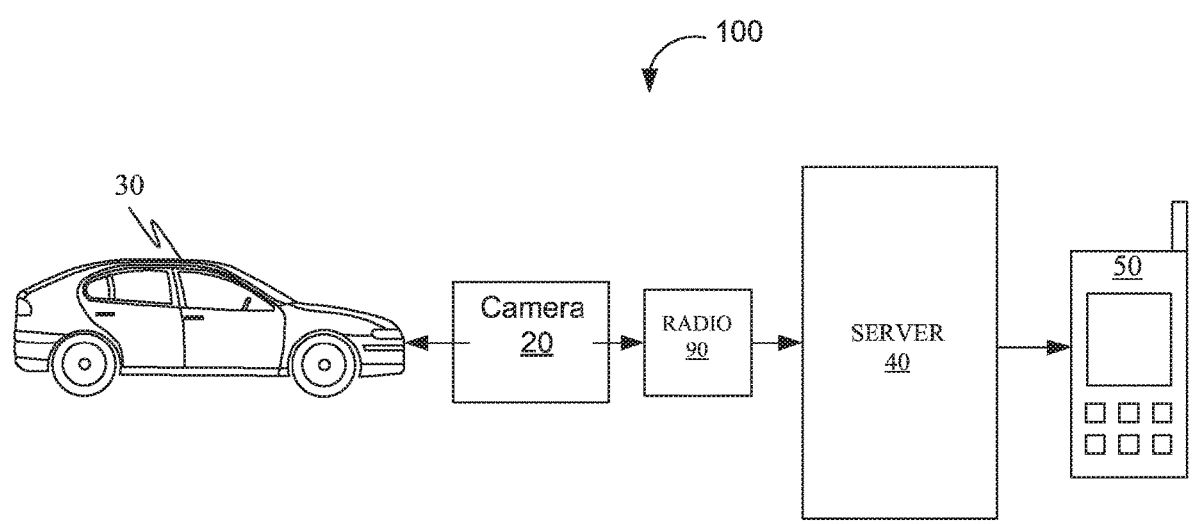
FIG. 2 depicts a block diagram of one embodiment of a mobile surveillance system, wherein the system comprises mobile device in communication with a server and a radio.

Referring now to FIG. 2, a mobile monitoring system 100 is shown, according to another embodiment of the present invention. In this embodiment of the present invention, the camera 20 is adapted to the surveillance area 30, and is in communication with a radio 90. The surveillance data captured from the surveillance 30 area is transmitted from the surveillance area 30 to the radio 90 for processing. The radio 90 can include frequency tuners associated with each camera 20 to enable a user to receive surveillance data transmitted over a particular frequency via a transmitter linked with the camera 60. This surveillance data may be subsequently transmitted from the radio 90 to the server 40 before being transferred to the mobile device 50 of the user. In an alternate embodiment of the present invention, the data may be transferred directly from the radio 90 to the mobile device 50 of the user. Additionally, the radio 90 may be engaged to at least one camera 20 to capture surveillance data for transmission to the mobile device 50.

Figure 3:
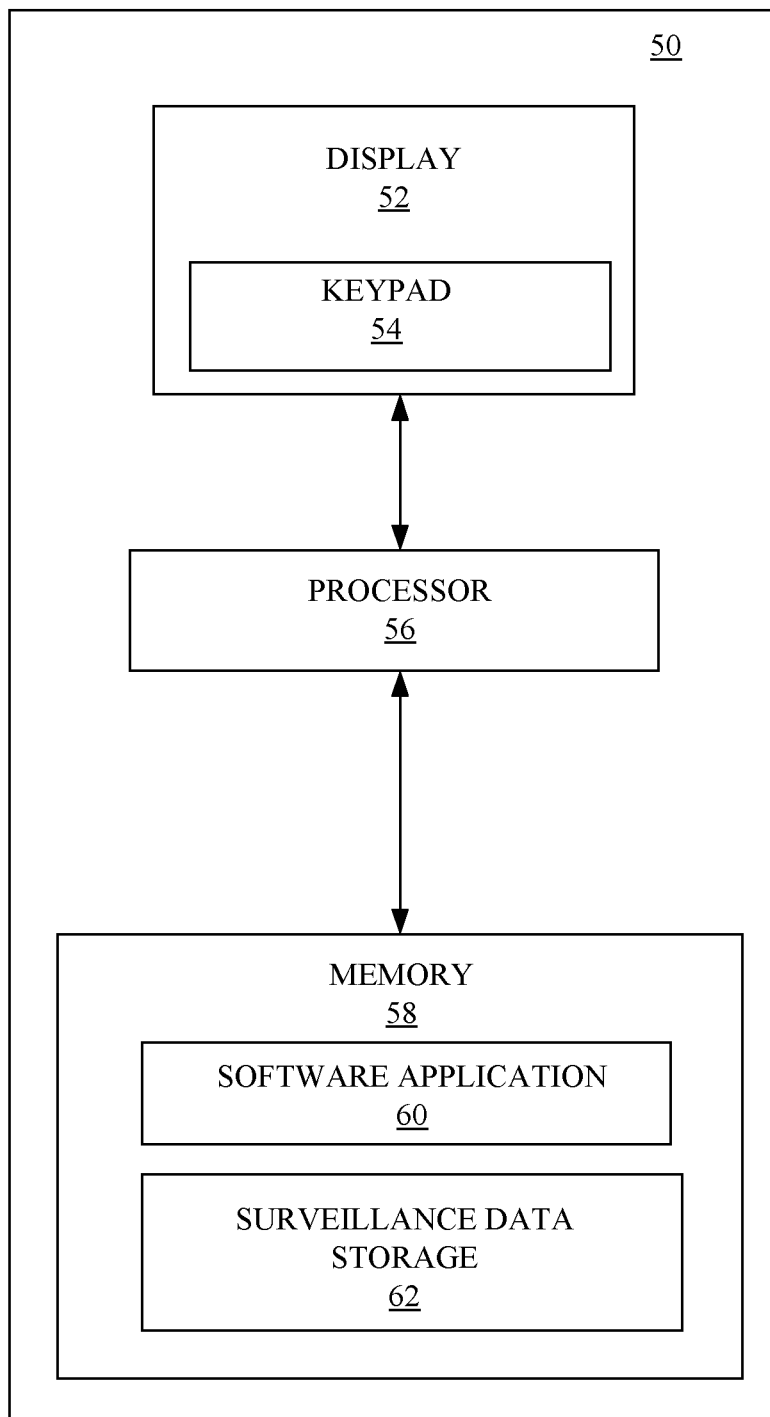
FIG. 3 depicts a block diagram of one embodiment of a mobile device.

Referring now to FIG. 3, a block diagram of the mobile device 50 is depicted wherein the mobile device 50 is configured to receive surveillance data at a predetermined time or occurrence according to one embodiment of the present invention. The mobile device 50 can include any type of wireless communications device such as a cellular phone or PDA device. The mobile device 50 comprises a processor 56 in communication with a software application 60 or similar computer-readable medium, and surveillance data storage 62. The mobile device 50 can further comprise computer-readable code that is executable by the processor 56, —which is in communication with the software application. 60. The processor 56 can communicate with a plurality of other mobile device components to provide for the transfer of surveillance data at a predetermined time or event, such as upon motion detection. Upon processing of the surveillance data, the captured surveillance data is transferred from the surveillance area 30 and subsequently delivered as at least one of audio, video and image data to the mobile device 50.

In the preferred embodiment of the present invention, a key board 54 or other graphical user interface of the mobile device 50 permits a user to store, retrieve and manipulate surveillance data. The software application 60 may be in communication with the mobile device 50 to allow the user to communicate with the software application 60 and display any data upon user request using the display 52 and keypad 54 of the mobile device 50. The software application 60 can output data to the display 52 and allow the user to interact with the mobile device 50 via the keypad 54.

The software application 60 may also communicate other information and surveillance data to the mobile device 50 at the command of the user. The mobile device 50 may also include a microprocessor, memory unit, display or any additional interface components. The mobile device 50 can also include a datebook, wherein the datebook depicts a month of dates associated with a time of day and/or event. These dates and times may be synchronized with the software application 60 of the mobile device 50 to permit the user to activate software to control the underlying recording of surveillance data associated with specific events and/or times at the surveillance area 30. The user keypad 54 may be adapted to the display 52 to permit the user to access and manipulate the mobile device 50 for a particular purpose, such as, for example, viewing images on display 52. Additionally, the system may be used in conjunction with any web applications, such as a downloadable I-PHONE application or the like, that will IO provide the user the ability to interact with the software application 60 and other mobile components to manage and operate the mobile surveillance system 10. For example, the user may also set-up a website in connection with an Internet Service Provider that will enable user to route surveillance data uploads to the website accordingly. Those skilled in the art recognize that user interface may be implemented as a touch screen user interface. In addition, the mobile device 50 may comprise a speaker or similar components to generate sounds and other audio information associated with surveillance data transmitted to the mobile device 50 from the surveillance area 30.

The surveillance data storage 62 may operate in combination with the software application 60 to allow the user to access stored surveillance data. The software application 60 may communicate with the surveillance data storage 62 through the processor 56 to obtain stored surveillance data transferred to the mobile device 50. The mobile device may include a memory 58 that communicates with the software application 60 and the surveillance data storage 62. In addition, the processor 56 may comprise a transmitter or receiver to allow the user to communicate wirelessly with a 25 network. This allows the user to communicate wirelessly with calls, or short message service (SMS) messages with the software application to control the mobile surveillance system 10. For example, the user may transmit instructions, such as voice signals or SMS messages, from the mobile device components to the communications network to start and stop surveillance at the surveillance area 30. Additionally, the user may transfer and receive surveillance data intermittently through the use of the mobile device 50. The mobile device 50 may also include a power supply to provide power to the mobile device 50. For instance, a battery or similar rechargeable device can be used to provide power.

The mobile device 50 may be programmed to activate at a predetermined time or at the occurrence of motion or movement at the surveillance area 30. In other embodiments of the present invention, the mobile device 50 may be programmed to transmit multiple combinations of surveillance data, such as either audio and/or or video data, from the server 40 to the display screen of the mobile device 50 at a predetermined time or upon the detection of motion. For instance, the audio data can be transferred to the mobile device 50 at a predetermined time, wherein the video data can be transferred upon the detection of motion at the surveillance area 30. The software application 60 can be used to synchronize the delivery of the audio and video data to the display 52 of the mobile device 50.

The motion detection can be configured to function with the camera device and software application 60. Specifically, the motion detection device provides a means to detect movement within the recorded surveillance data or at the surveillance area 30. The motion detection means can also be configured to detect variations in audio motion. For instance, the motion detection means may detect a change in audio using an audio sensor or similar device. Changes may be detected at different times at the surveillance area or based on identified sound variations at the surveillance area.

Alternatively, the motion detection means may be engaged to a tracking system configured to the surveillance area. For example, wherein the surveillance area is a vehicle, a tracking device may be connected to the system to provide tracking satellites in communication with a wireless network and the mobile device. Therefore, upon detection of motion, the tracking device can provide navigational data that can be updated to the mobile device of the user. Types of tracking devices can include a global positioning system (GPS) receiver and the tracking satellites. In addition, the navigational data can include GPS coordinates such as a latitude coordinate, a longitude coordinate and an altitude coordinate. Those with skill in the art will appreciate that additional alternative methods and designs for motion detection may be used in accordance with the present invention.

The mobile device 50 may be automatically updated with additional audio and video data stored on the server 40. The additional surveillance data may be updated upon a user request, predetermined time intervals or upon the occurrence of an event, such as the detection of motion at the surveillance area 30. The newly received surveillance data may be stored into the mobile device 50 or restored in place of the preceding surveillance data received and delivered to the surveillance data storage 62 of the mobile device 50, so that the memory 58 of the mobile device 50 maintains the most recently transferred surveillance data. Alternatively, the surveillance data may also be stored at the server 40.

Figure 4:
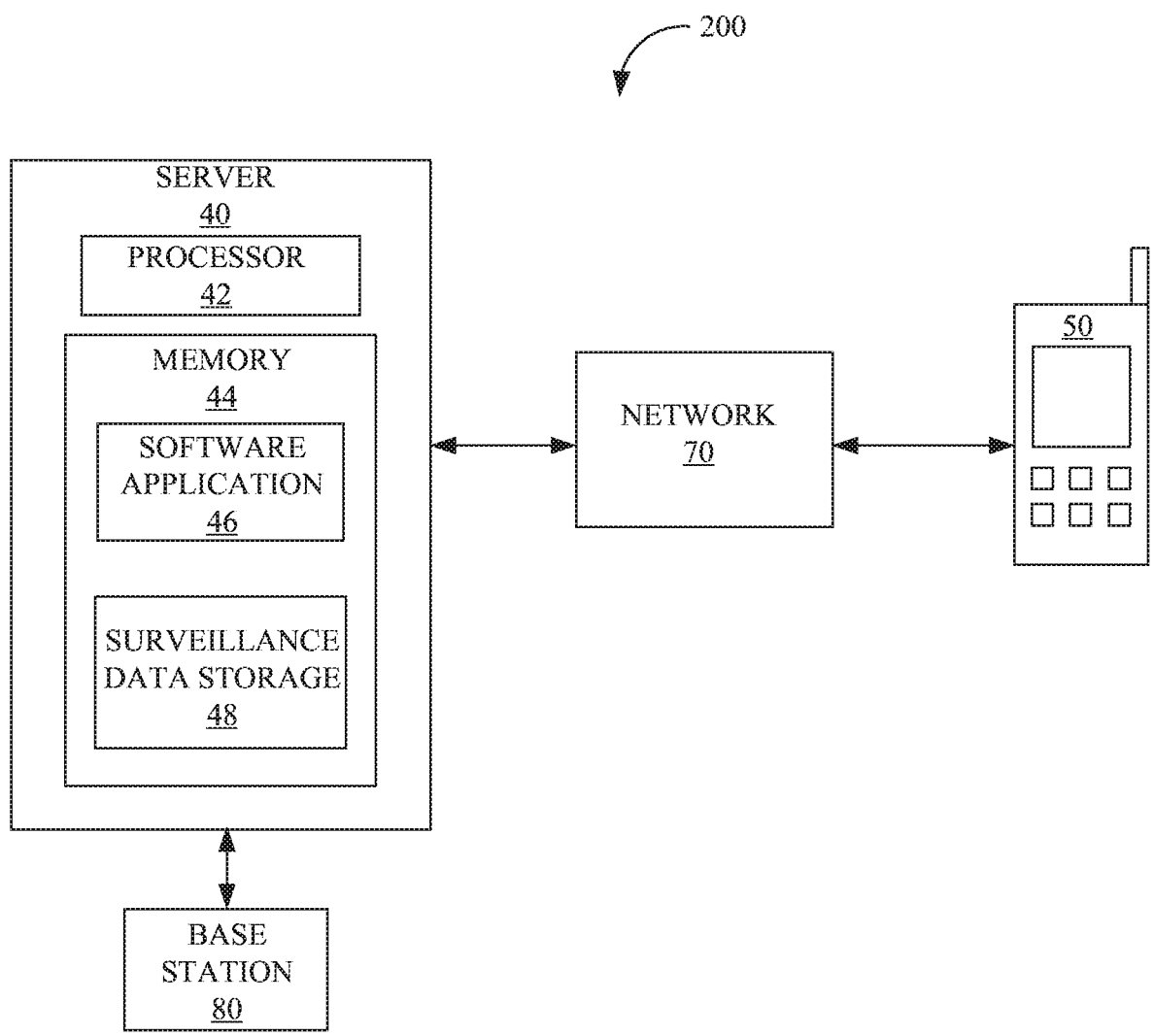
FIG. 4 depicts a block diagram of one embodiment of a mobile surveillance system, wherein the system comprises a mobile device in communication with a base station via a network and a server.

FIG. 4 illustrates another embodiment of the mobile surveillance system 200, wherein a wireless network 70 and a base station 80 are in communication with the server 40. In this embodiment, surveillance data captured by the camera 20 may be transferred to the wireless network 70. The network 70 then retransmits the surveillance data, at the request of authorized users of the mobile device 50. This surveillance data is subsequently received by the mobile device 50 through its transmitter or receiver adapted to the mobile device 50. The network 70 may be configured to transfer surveillance data between a plurality of devices. For instance, the network 70 may comprise a wireless communications terminal that communicates wirelessly with the mobile device 50 and wirelessly or through wires to a public switched phone network, wide area network, local area network, or otherwise, that is connected to the server 40. The network 70 may also communicate with the mobile device 50 over wires. For example, the mobile device 50 may be connected to a computer system via a universal serial bus (USB) port, or otherwise, and the computer system may be connected to a local area network (LAN), wide area network (WAN), public switched telephone network (PSTN), or otherwise. The LAN, WAN, PSTN, or otherwise, may communicate directly to the server 40 or through additional networks.

The server 40 is in communication with the network 70 and comprises a processor 42 and a memory 44. The memory 44 includes a software application 46, surveillance data storage 48, and a base/control station 80. The software application 46 may include computer readable software and a server engine for causing the server 40 to communicate with the mobile device 50 and base/control station 80.

The base station 80 transmits surveillance data to the surveillance data storage 48 and communicates to the server 40 when the surveillance data should be transmitted to the mobile device 50. The server 40 is thereby adapted to receive surveillance data from the base station 80. The server 30 automatically updates the audio data and/or video data to the mobile device 50 by sending surveillance data obtained from the base station 80 to the mobile device 50. The base station 80 provides a radio receiver/transmitter that serves as the control of the local wireless network 70, and may also provide a gateway between a wired network and the wireless network 70. For example, the base station 80 may be a computer system that uploads files including the surveillance data associating the surveillance data with a predetermined time or similar user event to the server 40 and surveillance data storage 48. The computer system may also send to the server 40 a command to transmit the stored surveillance data to the mobile device 50.

In an alternate embodiment, the surveillance data may be displayed as streaming surveillance data within the display 52 area of the mobile device 50 or stored in the surveillance data storage 62 within the mobile device 50 to be viewed later by the user. Those with skill in the art will understand that the network of the mobile device 50 may also be configured to utilize Bluetooth or other similar technology.

Figure 5:
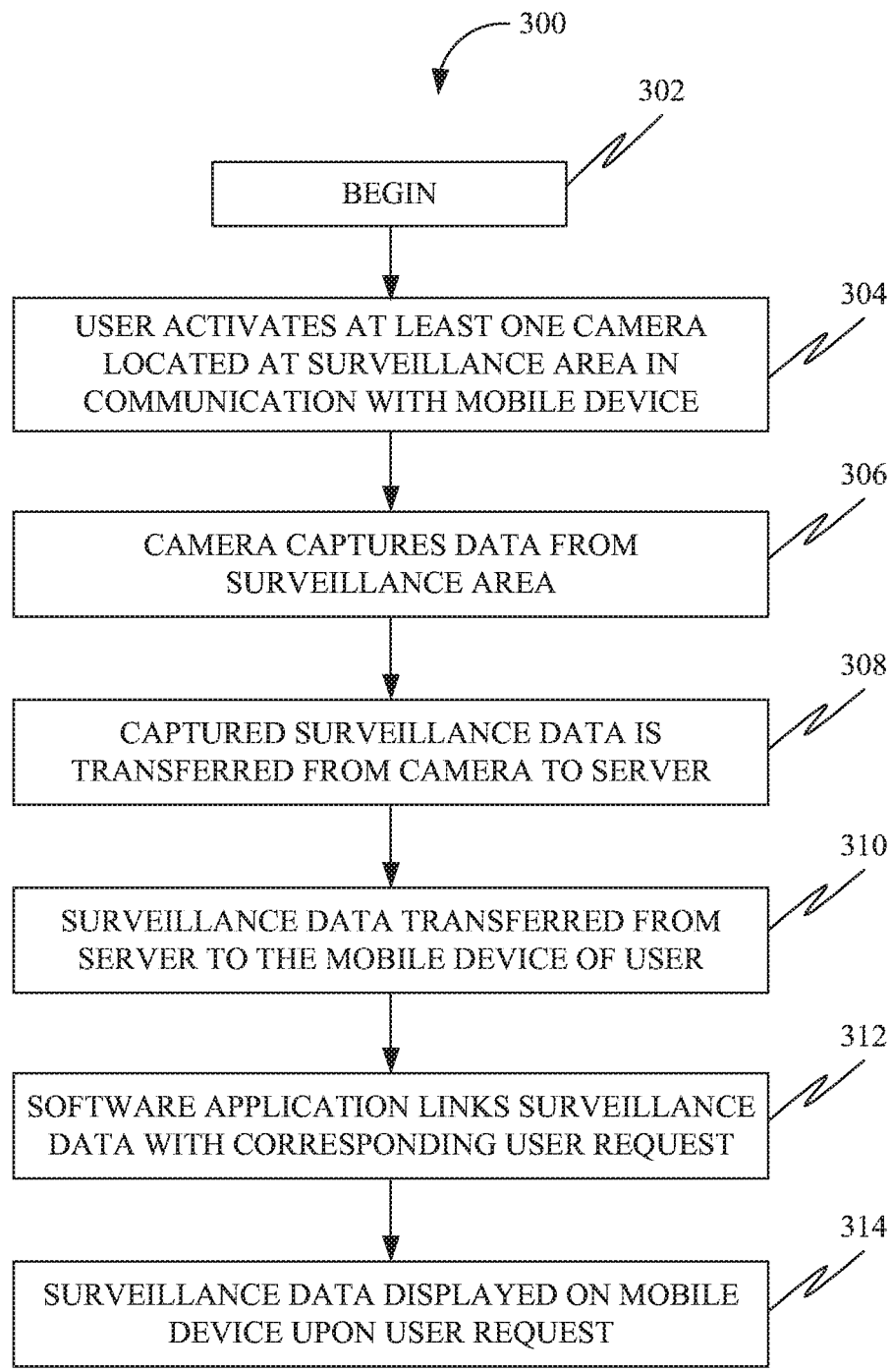
FIG. 5 depicts a flow diagram of a method of delivering surveillance data from a surveillance area to a mobile device upon request of a user.

Referring now to FIG. 5, a flow chart of the steps 300 of a method of delivering surveillance data to a mobile device, according to one embodiment of the present invention. The method is initiated, as depicted at block 302. As shown next at block 304, a user activates at least one camera in communication with a mobile device, such as the mobile device shown in FIG. 1. A plurality of cameras may be adapted to the surveillance area and in communication with the mobile device in support of other embodiments of the present invention. The camera is configured to capture surveillance data at the surveillance area at block 306 and may be linked and transmitted utilizing a wireless gateway or wireless network. As illustrated at block 308, captured surveillance data is transferred from the camera to a server in control of the camera(s) or the transmitter associated with the camera. Surveillance data is subsequently transferred to the mobile device in response to a user request, as depicted at block 310.

The surveillance data can be processed by a software application in communication with the mobile device wherein the surveillance data is linked with the user request, as illustrated at block 312. Alternatively, the surveillance data may be associated with a predetermined time or event, such as motion detection, associated with the user request. As illustrated thereafter at block 314, the surveillance data captured by the camera is displayed on a display of the mobile device. For example, the display 52 of FIG. 3 is capable of displaying surveillance data according to a user request. The steps may be initiated from the beginning upon an additional request of the user.

The above figures and disclosures are intended to be illustrative and not exhaustive. This description will suggest many variations and alternatives to one of ordinary skill in the art. All such variations and alternatives are intended to be encompassed within the scope of the attached claims. Those familiar with the art may recognized other equivalents to the specific embodiments described herein which equivalents are also intended to encompass by the attached claims. Moreover, the use of this invention on a wire guide is not a limitation of the claims. Use of this device with other tubing and elongate medical devices used in medical procedures and the like is understood to be within the scope of the claims.

It is to be understood that the present invention is not limited to the embodiment described above, but encompasses any and all embodiments within the scope of the following claims.

What is claimed is:

1. A method for conducting surveillance comprising:
   configuring a mobile device to communicate with a server, wherein said server includes a server processor and is adapted for receiving surveillance data transferred electronically from a surveillance area;
   positioning at least one camera at said surveillance area for capturing surveillance data, wherein said surveillance data comprises at least one of: audio, video, images, point in time, and location data associated with the surveillance area;
   capturing said surveillance data;
   using the mobile device to control start and stop of the capture of the surveillance data at the surveillance area;
   providing a motion detection device to detect variations in motion measurements at the surveillance area; and
   transferring surveillance data from the server to the mobile device when the motion detection device obtains a motion detection measurement that exceeds a predetermined threshold indicating the surveillance area is unsecure,
   wherein the mobile device displays a datebook comprising days of the week and times of day that can be synchronized with an application of the user device to schedule the transferring of surveillance data.

2. The method according to claim 1, the method further comprising providing a global positioning system receiver to provide location data associated with the surveillance area.

3. The method according to claim 1, further comprising configuring a radio to communicate with said camera, wherein said radio includes frequency tuners to enable the user to receive surveillance data transmitted over a determined frequency.

4. The method according to claim 1, further comprising instructing the server to send the mobile device a message service message indicating delivery of said surveillance data.

5. The method according to claim 1, wherein said server is in communication with a network and a base station, and further comprising adapting said server to receive said surveillance data from the base station through the network.

6. The method according to claim 5, further comprising sending a command from the base station to the server to transmit surveillance data to the mobile device.

7. The method according to claim 6, further comprising updating surveillance data automatically by sending surveillance data obtained from the base station to the mobile device for a predetermined time after the motion detection device obtains the motion detection measurement that exceeds the predetermined threshold.

8. The method according to claim 1, further comprising configuring a software application of the mobile device to synchronize delivery of the surveillance data and corresponding metadata to a display of the mobile device.

9. The method according to claim 1, wherein said mobile device further comprises a memory and a mobile device processor, and further comprising configuring said memory to store the surveillance data.

10. A method for conducting surveillance comprising:
    receiving an instruction from a mobile device to control start and stop of capture of surveillance data at a surveillance area;
    capturing the surveillance data by a camera at the surveillance area, wherein the camera is operably engaged to a motion detection mechanism for detecting variations in motion measurements at the surveillance area; and
    transferring said surveillance data to the mobile device when the motion detection mechanism obtains a motion detection measurement that exceeds a predetermined threshold indicating the surveillance area is unsecure,
    wherein the mobile device displays a datebook comprising days of the week and times of day that can be synchronized with an application of the user device to schedule the transferring of surveillance data.

11. The method according to claim 10, further comprising displaying the surveillance data on the mobile device when the motion detection mechanism obtains the motion detection measurement that exceeds the predetermined threshold.

12. The method according to claim 10, further comprising providing a global position system to provide location data associated with the surveillance area.

13. The method according to claim 10, further comprising configuring a radio to communicate with said camera, wherein said radio includes one or more frequency tuners to enable the mobile device to receive the surveillance data over a predetermined frequency.

14. The method according to claim 10, further comprising sending the mobile device a short message service message indicating delivery of said surveillance data to the mobile device.

15. The method according to claim 10, further comprising providing a server in communication with a network and a base station, and adapting said server to receive the surveillance data from the base station through the network.

16. The method according to claim 15, further comprising sending a command from the base station to the server to transmit the surveillance data to the mobile device.

17. The method according to claim 16, further comprising updating the surveillance data sent to the mobile device for a predetermined length of time after the motion detection device obtains the motion detection measurement that exceeds the predetermined threshold.

18. A method for conducting surveillance, comprising:
    configuring a mobile device to communicate with at least one camera positioned at a surveillance area;
    capturing surveillance data associated with the surveillance area with the at least one camera;
    configuring the mobile device to control start and stop of the capture of the surveillance data and transfer of the surveillance data;
    transmitting the surveillance data wirelessly to the mobile device from a transmitter in communication with the camera upon detection of motion at the surveillance area exceeding a predetermined threshold,
    wherein the mobile device displays a datebook comprising days of the week and times of day that can be synchronized with an application of the user device to schedule the transferring of surveillance data.

19. The method according to claim 18, further comprising:
transferring the surveillance data to a server in communication with the transmitter; and
storing the surveillance data at the server.

20. The method according to claim 19, further comprising configuring the mobile device to control transmission of at least a portion of the surveillance data from the server to the mobile device for display on the mobile device.

* * * * *